United States Patent Office 3,650,990
Patented Mar. 21, 1972

3,650,990
CATALYST AND METHOD FOR PREPARING SAME
Vincent J. Frilette, Yardley, Pa., and Russell W. Maatman, Sioux Center, Iowa, assignors to Mobil Oil Corporation
No Drawing. Continuation-in-part of application Ser. No. 711,215, Mar. 7, 1968, which is a continuation-in-part of application Ser. No. 319,639, Oct. 29, 1963, now Patent No. 3,373,109, which in turn is a continuation-in-part of application Ser. No. 774,124, Nov. 17, 1958. This application Oct. 9, 1969, Ser. No. 865,173
The portion of the term of the patent subsequent to Mar. 12, 1985, has been disclaimed
Int. Cl. B01j 11/40
U.S. Cl. 252—455 Z
24 Claims

ABSTRACT OF THE DISCLOSURE

Crystalline aluminosilicate zeolite having uniform pores of from greater than 6 angstroms to 15 angstroms in diameter and containing specified metal and/or metal ions therein, prepared by "growing" crystals of such aluminosilicate from an aqueous medium containing said metal in anionic form.

CROSS-REFERENCES TO RELATED APPLICATIONS

This application is a continuation-in-part of our application Ser. No. 711,215, filed Mar. 7, 1968, now abandoned, said application Ser. No. 711,215 being a continuation-in-part of our application Ser. No. 319,639, filed Oct. 29, 1963, and now U.S. Pat. No. 3,373,109, said application Ser. No. 319,639 being a continuation-in-part of our application Ser. No. 774,124, filed Nov. 17, 1958, now abandoned.

BACKGROUND OF THE INVENTION (1) Field of the invention

This invention relates to a novel catalyst and to a method for preparing such a catalyst. More particularly, the present invention is directed to a catalytic composition made up of a crystalline inorganic aluminosilicate zeolite characterized by rigid three-dimensional networks and uniform interstitial dimensions, this zeolite containing therewithin a minor proportion of a metal, ions of such metal, compounds of such metal, or mixtures thereof, the metal being one which is capable of forming a Werner complex. The invention also relates to a method for preparing such a catalytic composition.

(2) Description of the prior art

Crystalline inorganic aluminosilicate zeolites, frequently referred to as "molecular sieves," have long been known to occur naturally. Such naturally occurring zeolites appear in a wide variety of crystallographic forms, e.g., heulandite, sodalite, gmelinite, faujasite, and the like. Such minerals all have in common a structure characterized by rigid three-dimensional networks composed of silicon, aluminum and oxygen atoms arranged in a variety of ways but always such that the crystals possess interstitial channels communicating with cavities, which channels and cavities are, in the natural state, filled by water. These channels also contain mobile cations, the most characteristic of which are sodium and calcium ions.

More recently it has become known that many of the naturally occurring crystalline aluminosilicates can be synthesized. Moreover, many crystalline aluminosilicates not found in nature have been successfully synthesized. Such a synthesis is generally effected by mixing together a silicon-containing compound such as a sodium metasilicate and an aluminum-containing compound such as sodium aluminate. Thereafter, the formation of a synthetic crystalline or cryptocrystalline aluminosilicate is induced by subjecting the aqueous slurry to a controlled heating.

Synthesis of a number of types of crystalline aluminosilicates are presently being conducted on a commercial scale, for the resulting products have found application in a variety of industrial processes, e.g., drying, purification, catalysis, and the like.

A considerable number of different catalytic properties have been found to be attributable to crystalline aluminosilicates. For example, crystalline aluminosilicate salts have been found to be effective in catalyzing various reactions such as cracking, polymerization, alkylation, isomerization, and the like. It is also known that crystalline aluminosilicates possess the ability to promote the oxidation of various carbon-containing compounds. It has further been reported that, by appropriate selection of particular crystallographic specie of crystalline aluminosilicate, a "sieve-like" effect is attainable, whereby only certain molecules within a mixture of reactable components are actually reacted.

It is also known that the catalytic properties of crystalline aluminosilicates can be altered by introducing into the interstitial channels and cavities thereof one or more catalytically active materials. Such introduction, as heretofore described, involves first effecting crystal formation of the aluminosilicate and thereafter introducing therein the appropriate catalytically active material. The resulting catalyst will generally exhibit a catalytic activity which is at least in part attributable to the migratory catalytically active material so introduced.

SUMMARY OF THE INVENTION

The present invention provides a catalytic composition made up of a crystalline aluminosilicate zeolite characterized by rigid three-dimensional networks and uniform interstitial dimensions, which zeolite contains therein a metal, ions of such metal, a compound of such metal, or mixtures thereof, which metal is one which is capable of forming a Werner complex. Such a zeolite results from the growth of crystals of the zeolite from an aqueous medium containing a water-soluble compound of the metal.

The catalytic compositions of this invention exhibit remarkable catalytic properties. For example, such compositions are suitable for catalyzing oxidation, hydrogenation, cracking, isomerization, etc. One particularly desirable property of certain of the catalytic compositions of this invention is an ability to selectively operate on only certain components of a given charge feed, e.g., to effect selective oxidation wherein only certain components of a charge are oxidized while the remainder are unaffected. Moreover, the presence of a minor amount of a specified metal and/or ions from such metal in the catalytic compositions has been found, in many instances, to introduce new catalytic properties or to alter certain of the catalytic properties, without substantially affecting other catalytic properties. Thus, oxidation activity may be imparted to a crystalline aluminosilicate zeolite by virtue of having effected crystallization in the presence of a metal compound wherein the metal is one which is capable of forming a Werner complex, without affecting the cracking activity of such zeolite. This permits more efficient coke burning and regeneration of spent cracking catalyst.

The catalytic compositions of the present invention are generally characterized by the fact that the minor amount of metal, metal ions, metal compound, or mixtures thereof contained within the crystalline aluminosilicate zeolite is strongly bound or "fixed" therein. Thus, once incorporated, the metal, metal ions, metal compound, or mixtures thereof are not easily removed. For instance, conventional techniques for ion removal or ion exchange, such as washing or base exchange, are usually ineffectual. It will therefore be seen that the catalytic compositions of the present invention are to be distinguished from those catalysts known heretofore and which are made up of aluminosilicate zeolites wherein a metal or metallic ion has been introduced into the crystalline zeolite after crystallization, e.g., by means of base-exchange or the like.

In accordance with one aspect of the invention there is provided a catalytic composition of a crystalline aluminosilicate zeolite characterized by rigid three-dimensional networks, uniform pores of from in excess of 6 angstroms to 15 angstroms in diameter, and containing therein a minor amount of a metal and/or ions of such metal, the metal being one capable of forming a Werner complex, said zeolite resulting from the growth of crystals of said zeolite from an aqueous medium containing a water-soluble compound of the foregoing metal.

Another aspect of this invention resides in a method of preparing a catalytic composition of a crystalline alumino-silicate zeolite containing a minor proportion of a specified metal and/or ions of said metal within its crystal structure, this method comprosing introducing into an aqueous reaction mixture capable of forming a crystalline aluminosilicate zeolite characterized by uniform pores of from in excess of 6 angstroms to 15 angstroms in diameter, a minor proportion of a water-solube ionizable metal compound wherein the metal is in the anionic form, the metal of such metal compound being capable of forming a Werner complex, inducing crystallization of such mixture in the presence of the metal compound, and dehydrating the resulting crystalline product.

Yet another aspect of the present invention resides in a method of preparing a catalytic composition which comprises introducing into an aqueous reaction solution having an appropriate composition, expressed as oxides of $SiO_2$, $Al_2O_3$, $Na_2O$ and $H_2O$ capable of serving as a source for crystallization of a crystalline aluminosilicate zeolite characterized by uniform pores of from in excess of 6 angstroms to 15 angstroms in diameter; a minor proportion of a water-soluble ionizable metal compound wherein the metal is in the anionic form, the metal of such compound being one which is capable of forming a Werner complex, inducing crystallization of the resulting reaction mixture by subjecting such mixture to hydrothermal treatment, and drying the material so obtained so as to form a crystalline alumino silicate zeolite characterized by uniform pores of from in excess of 6 angstroms to 15 angstroms in diameter.

Reaction solutions of controlled composition capable of serving as a source for crystallization of an aluminosilicate zeolite, characterized by pores within the aforenoted range are well known in the art. Thus, one such aluminosilicate in Linde Zeolite X. Typical reaction solution compositions, expressed as mixtures of oxides, resulting in crystallization of this zeolite having uniform pores of from in excess of 6 angstroms to 15 angstroms in diameter include the following:

$SiO_2/Al_2O_3$: 3 to 5, 2 to 40, 2.4 to 30, 3 to 15
$Na_2O/SiO_2$: 1.2 to 1.5, 0.6 to 6.0, 0.4 to 6.5, 4 to 7
$H_2O/Na_2O$: 35 to 60, 10 to 30, 10 to 90, 30 to 70

Another such aluminosilicate is Linde Zeolite Y. Typical reaction solution compositions, utilizing an aqueous colloidal silica sol or a reactive amorphous solid silica as the major source of silica, which result in crystallization of this zeolite are as follows:

$Na_2O/SiO_2$: 0.20 to 0.40, 0.41 to 0.60, 0.61 to 0.80
$SiO_2/Al_2O_3$: 10 to 40, 10 to 30, 7 to 30
$H_2O/Na_2O$: 25 to 60, 20 to 60, 20 to 60

When silica sources such as sodium silicate, silica gels or silicic acid are employed as the major source of silica, zeolite Y may be prepared from reaction mixtures of the following typical composition:

$Na_2O/SiO_2$: 0.6 to 1.0, 1.5 to 1.7, 1.9 to 2.1
$SiO_2/Al_2O_3$: 8 to 30, 10 to 30, about 10
$H_2O/Na_2O$: 12 to 90, 20 to 90, 40 to 90

A further aspect of the present invention resides in a method for preparing a catalytic composition which comprises introducing into an aqueous reaction solution having a composition, as above defined; a minor proportion of a water-soluble ionizable metal compound, the metal of such compound being one which is capable of forming a Werner complex, inducing crystallization of the resulting reaction mixture by subjecting it to hydrothermal treatment, replacing sodium ions of the resulting crystalline product with calcium, and drying the resulting material so as to form a crystalilne aluminosilicate zeolite characterized by uniform pores of about 10 angstroms in diameter.

Yet a further aspect of the invention resides in a method of preparing a catalytic composition by introducing into a reaction mixture of sodium aluminate and sodium metasilicate, a minor proportion of an ionizable metal compound in which the metal is present in the anionic form, the metal of such compound being one capable of forming a Werner complex, inducing crystallization of the resulting mixture by subjecting it to hydrothermal treatment at a temperature of from about 21 to 150° C., and drying the resultant crystalline material to yield a crystalline alumino-silicate characterized by rigid three-dimensional networks and uniform pores of from in excess of 6 angstroms to 15 angstroms in diameter, and containing therein the foregoing metal and/or ions of such metal. Thereafter, if desired, the foregoing product can be subjected to further reaction, e.g., sulfiding, carbiding, nitriding, oxidizing, seleniding, telluriding, hydriding, haliding, or the like to form the corresponding metal compound within the crystalline aluminosilicate, e.g., metal sulfide, carbide, nitride, oxide, selenide, telluride, hydride, halide, etc.

DESCRIPTION OF THE SPECIFIC EMBODIMENTS

In general, the synthetic crystalline aluminosilicates or cryptocrystalline aluminosilicates of this invention are prepared by methods and recipes similar to those described in the art. For example, the proportions of alkali or alkaline earth metal, silicon-containing, and aluminum-containing compounds; the specific compounds used; and the temperatures and times of treatment described in U.S. Pat. 2,882,244 for the preparation of zeolite-X, in U.S. Pat. 3,130,007 for the preparation of zeolite-Y, all are applicable, with the added metal compound introduced *prior* to crystallization. Also applicable are the various preparational methods described in the literature by such well-known authorities as R. M. Barrer for the preparation of synthetic mordenite, faujasite, etc. Other suitable synthetic zeolites that are suitable for the present invention include Zeolite L and Ferrierite.

The crystalline aluminosilicate zeolites employed in preparation of the catalyst described herein are adsorbents designated as molecular sieves. Molecular sieves are essentially the dehydrated forms of crystalline natural or synthetic hydrous siliceous zeolites containing varying quantities of sodium, calcium or aluminum with or without other metals. All or a portion of the sodium or calcium ions normally contained in the molecular sieve structure may be zeolitically replaced with a number of various other ions. The atoms of sodium, calcium or metals in replacement thereof, silicon, aluminum, and oxygen in these zeolites are arranged in the form of aluminosilicate salts in a definite and consistent crystalline pattern. This structure contains a large number of small cavities interconnected by a umber of still smaller holes or channels. These cavities and channels are precisely uniform in size.

Chemically, these zeolites may be represented by the general formula:

$$Me_{x/n}[(AlO_2)_x(SiO_2)_y] \cdot zH_2O$$

where Me is a metal cation, $x/n$ is the number of exchangeable cations of valence $n$, $x$ is also the number of aluminum atoms combined in the form of aluminate, $y$ is the number of silicon atoms and $z$ is the number of water molecules, removal of which produces the characteristic channel system. In the above formula, the ratio $y/x$ is a number from 1 to 5 and usually 1 to 2. At the present time, there are commercially available a number of different types of molecular sieves, e.g. of the A series, of the X series, the Y series, etc. A synthetic zeolite known as "Molecular Sieve 4A" is a crystalline sodium aluminosilicate having channels about 4 angstroms in diameter. In the hydrated form, this material is chemically characterized by the formula: $Na_{12}(AlO_2)_{12}(SiO_2)_{12} \cdot 27H_2O$. The synthetic zeolite known as "Molecular Sieve 5A" is a crystalline aluminosilicate salt having channels about 5 angstroms in diameter and in which substantially all of the 12 ions of sodium in the immediately above formula are replaced by calcium, it being understood that calcium replaced sodium in the ratio of one calcium ion for two sodium ions. A crystalline sodium aluminosilicate which has pores or channels of approximately 13 angstrom units in diameter is available commercially under the name of "Molecular Sieve 13X." The letter X is used to distinguish the interatomic structure of this zeolite from that of the A crystal mentioned above. As prepared, the 13X material contains water and has the unit cell formula $Na_{86}[(AlO_2)_{86}(SiO_2)_{106}] \cdot 267H_2O$. The 13X material is 13X matreial is structurally identified with faujasite, a naturally occurring zeolite. Faujasite, however, is not identical in composition with the 13X zeolite. The synthetic zeolite known as "Molecular Sieve 10X" is a crystalline aluminosilicate salt having channels about 10 angstrom units in diameter and in which a substantial proportion of the sodium ions of the 13X material have been replaced by calcium.

Molecular sieves, e.g., as of the X series, are ordinarily prepared initially in the sodium form of the crystal. The sodium ions in such form may, as desired, be exchanged for other cations. In general, the process of preparation involves mixing an aluminum-containing compound with a silicon-containing compound to form an amorphous precipitate. Usually, sodium aluminate and sodium silicate are employed. Thereafter, the resulting precipitate is heated in aqueous solution to induce crystallization thereby forming the crystalline inorganic zeolite. The temperature of such hydrothermal treatment is generally about 100° C. and the times of such treatment is usually between about 15 minutes and 90 hours or more. The product which crystallizes within this hot mixture is separated therefrom and water washed until the water in equilibrium with the zeolite has a pH in the range of 9 to 12, and thereafter dehydrated by heating.

Suitable reagents in the preparation of the sodium zeolite of the X series include silica gel, silicic acid, or sodium silicate as sources of silicon. Alumina can be supplied by utilizing activated alumina, gamma alumina, alpha alumina, aluminum trihydrate or sodium aluminate. Sodium hydroxide is suitably used as a source of the sodium ion and in addition contributes to the regulation of the pH. All reagents are preferably soluble in water. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or more or less corresponding to the equilibrium of the vapor pressure with the mixture at reaction temperature, crystallization is ordinarily carried out at about 100° C. For temperatures between room temperature (21° C.) and 150° C. an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation the crystalline zeolite is separated from the mother liquor usually by filtration. The crystalline mass is then washed, preferably with distilled water and while on the filter, until the wash water in equilibrium with the zeolite reaches a pH of 9 to 12. The crystals are then dried at a temperature between 25° C. and 150° C.

As indicated hereinabove, the sodium ions of the above zeolite may be replaced partially or completely by other cations. These replacing ions include other monovalent or divalent cations such as lithium and magnesium, metal ions of the first group of the Periodic Table such as potassium and silver, metal ions of the second group such as calcium and strontium, and other ions including cobalt and ammonium which, with the sodium zeolite of the "X" series, react as a metal in that they replace sodium ions without occasioning any appreciable change in the fundamental structure of the crystalline zeolite. Replacement is suitably accomplished by contacting the crystalline sodium aluminosilicate zeolite with a solution of an ionizable compound of the ion which is to be zeolitically introduced into the molecular sieve structure for a sufficient time to bring about the extent of desired introduction of such ion. After such treatment, the resulting exchanged product is water-washed and dried. The extent to which exchange takes place can be controlled. Thus, taking the exchange of sodium for calcium as a typical example, such exchange can be effected in a proportion of less than 5 percent up to 100 percent by contacting a known amount of the sodium zeolite with solutions containing determined amounts of exchangeable ions.

While the preparational methods for producing different crystalline aluminosilicates vary widely, they all in common have the feature that the reactants are comingled to form a non-crystalline intermediate, which may be a slurry, gel, or mixture, in aqueous medium, and thereafter the intermediate is subjected to further treatment or treatments, usually at elevated temperature, but not necessarily so, and for various periods of time, to convert the amorphous substance into a crystalline or cryptocrystalline product which is a member of the class of minerals hereinabove described.

In the practice of the present invention, catalytically novel properties are imparted to the crystalline products by the inclusion of minor amounts of a metal compound at a point in the procedure prior to inducing crystallization in aqueous medium of the amorphous solid, gel, or suspension. While a wide variety of metal compounds and quantities of these may be used, it is preferred that the compounds and amounts selected be such that they do not in general substantially alter the crystallizability of the amorphous precursors. In general, the amount of metal compound should be less than 10 weight percent of the total recoverable solids of the aqueous slurry, and preferably less than 1 percent. In special cases, the novel crystalline aluminosilicates of this invention may be prepared by using greater than 10 weight percent. In such instances, however, in order to preserve the crystallizability of the amorphous intermediate it may be necessary to withdraw a portion of one of the other ingredients.

The metal compounds of this invention may be derived from a wide variety of metals, preferably from these metals which form Werner complexes. In its general form, the chemical structure of the metals as complexes may be represented by $$[(M^n)a_xb_yc_zd_w]^m$$

in which M is the metal, $n$ is the valence state of the metal, which may vary from $+1$ to $+6$, $a$, $b$, $c$, $d$ are coordinated groups which may be capable of free existence as neutral species, such as $H_2O$, $NH_3$, or ethylene diamine, or negative species, such as Cl, OH, $SO_4$, and in which $x$, $y$, $z$, and $w$ are numbers which may vary from 0 to 8, but in which the sum of $x+y+z+w$ is 8 or less and $m$ is the resultant arithmetic electrostatic charge in the neighborhood of the complex, which is identical with $n$ when the coordinating species, $a$, $b$, $c$, and $d$ are neutral, or may vary from $n$ to $-6$ when the coordinating species bear a negative charge. In the preferred form of this invention, the metal compound to be added contains the metal in the form of a complex anion.

It is preferred in the practice of this invention to employ compounds of these metals selected from Groups IV–B, V–B, VI–B, VII–B, and Group VIII of the Periodic Table. Particularly preferred are metal compounds wherein the metal is platinum, manganese, iron, vanadium, chromium, molybdenum, titanium, cobalt, and palladium.

As will be recognized, the metal complexes of this invention and their compounds cover a very wide range in the stability spectrum. Also, some of these are very easily formed and others form only with great difficulty. For those which are very easily formed under reaction conditions, that is under conditions required for conversion of the amorphous intermediate to crystalline or cryptocrystalline solids, the metal need not be added as the complex compound but may be added in a more simple form, such as a simple salt, the complex compound being formed in situ. In other cases, it is preferred that the complex compound be formed externally to the reaction mixture and added thereto at some stage prior to the crystallization.

The preferred embodiment of the practice of this invention is to conduct the crystallization of a crystallizable aluminosilicate slurry in the presence of an anionic complex of a metal compound. Such compounds as, for example, chloroplatinic acid, sodium ferrate, potassium permanganate, and others, may be used. Thus, the metal portion of the complex metal anion is typically platinum, iron, manganese, cobalt, molybdenum, chromium, vanadium, titanium, or the like. In these instances, it appears that there is occasional *substitution* of one of the tetrahedra of either silicon or aluminum by th e complex metal anion. This "defect" structure so produced is believed responsible for some of the remarkable catalytic properties of the resulting products. Alternatively, the metal in anionic form may form an insoluble precipitate such as the corresponding metal hydroxide, which precipitate tends to resist subsequent removal from the crystalline aluminosilicate zeolite by conventional techniques such as ion exchange. It should be recognized that the occasional substitution of one of the tetrahedra of either silicon or aluminum by the complex metal anion may consume a small or a large fraction of the minor quantity of metal compound present as a Werner complex. To be effective for the purposes of this invention, only a relatively small fraction of the total added minor amount need be incorporated. It is in the nature of this invention that large, and often surprisingly large catalytic effects, are induced by the incorporation of minor or trace amounts of the added minor component as will be demonstrated hereinafter.

When anionic complexes are sparingly soluble, we have found that a soluble salt of the metal in cation form may be introduced into the system at the moment of aluminosilicate gel formation. At this instant the metal salt reacts with the excess hydroxyl ion present to form a metal hydroxide gel or precipitate mingled with the aluminosilicate particles. Products prepared in this manner usually show no inhomogeneity under microscopic examination. Furthermore, after crystallization, it is found that the incorporated metal is catalytically active beyond what would be expected from the amounts incorporated, thus indicating that the added metal has effectively been introduced into the rigid anionic lattice of the structure.

Another embodiment for the practice of this invention is to replace part or all of the alkali metal aluminate in recipes calling for addition of such material by the alkali metal salt of an anionic complex of the metal. One example, for instance, is the preparation of a crystalline aluminosilicate zeolite characterized by uniform pores from in excess of 6 angstroms to 15 angstroms in which sodium chromate replaces about half of the sodium aluminate.

As previously noted, in the preferred aspects of this invention, the products are characterized by the fact that the added metal compound is at least in part extremely strongly bound, i.e., the added metal content is not removed readily by rinsing or the usual base exchange procedures.

Moreover, the resultant crystalline aluminosilicate containing said metal, metal ions, or mixtures thereof may then be subjected to further reaction, e.g., sulfiding, carbiding, nitriding, oxding, seleniding, telluriding, hydriding, haliding (i.e., chloriding, bromiding, iodiding, or fluoriding), or the like using conventional reaction conditions. This results in the formation of the corresponding metal compound within the crystalline aluminosilicate, e.g., metal sulfide, carbide, nitride, oxide, selenide, telluride, hydride, halide, etc. Such metal compound is not readily removed by such conventional techniques as rinsing or base exchange.

As noted above, the conditions for effecting each of the foregoing reactions are conventional and well known in the art.

The above-described reactions are frequently advantageous when it is desired to enhance the catalytic activity of the foregoing catalyst of crystalline aluminosilicate containing therein metal, metal ions, or mixture thereof. For example, where such a crystalline aluminosilicate catalyst contains, as the metal content, molybdenum and tungsten, and such catalyst is to be used for hydrotreating, it generally is desirable to sulfide the catalyst prior to hydrotreating so as to form molybdenum and tungsten sulfides. As another illustration, where a metal-containing catalyst is to be used in reforming, it is desirable to fluoride the catalyst prior to reforming so as to obtain the corresponding metal fluoride, inasmuch as such fluorided catalyst gives both improved product distribution and activity. As yet a further example, where a metal-containing catalyst is to be used to aromatize paraffins, it is generally advantageous to first telluride the catalyst so as to form the corresponding metal telluride, hereby enhancing the catalyst performance.

The products of this invention should not be confused with crystals to which catalytic elements are added after crystallization. This is illustrated by the following:

A sample of 13X crystalline aluminosilicate was prepared containing 2600 p.p.m. iron by crystallization from an amorphous slurry to which sodium ferrate had been added. Oxidative conversion of CO over this catalyst was at least three times as effective as that over a catalyst prepared by addition of ferrous sulfate to a crystalline preparation after crystallization, even though both preparations had the same content of iron.

The catalytic compositions of the invention are prepared by introducing a water-soluble metal compound, wherein the metal is one capable of forming a Werner complex, the metal being in anionic form, into a zeolite-forming reaction mixture capable of producing crystals characterized by uniform pores of from in excess of 6 angstroms to 15 angstroms in diameter, the introduction being prior to crystallization of the zeolite product, and thereafter inducing crystallization of the zeolite by subjecting the reaction mixture to hydrothermal treatment, and dehydrating the resulting product. Such product may then be subjected to thermal treatment at a temperature in the approximate range of 250° F. to 1100° F.

Introduction of the metal compound to the zeolite-forming reaction mixture may be made by the addition of such compound to one of the reactants used in preparation of the forming mixture. Alternatively, the metal compound may be introduced by addition to the already formed zeolite reaction mixture, either before or after precipitation of the amorphous slurry. It is, however, essential that the metal compound be present in the reaction mixture before crystallization of the zeolite takes place in order that crystals of the zeolite may grow in the presence of the metal compound. It is contemplated that the specific reagents, amounts and concentrations for the aluminous and siliceous compounds and other reagents used in preparation of the zeolite employed herein are the same as those heretofore conventionally employed for the preparation of the above-described molecular sieve zeolites in the absence of a metal compound. Likewise, the conditions for inducing crystallization of the resulting initially formed amorphous precipitate are contemplated to be the same as those heretofore employed for preparation of the crystalline zeolites in the absence of metal compound.

Where the metal compound employed contains a metal of the platinum series, the metal may be platinum, palladium, iridium, rhodium, ruthenium, or osmium. Of this group platinum and palladium are accorded preference. Each of the platinum metals may occur in a variety of compounds. The compounds of the useful platinum metals are those in which the metal is present in the anion of the compound.

It is contemplated that water will ordinarily be the solvent for the metal compound used. The concentration of the metal compound in the solution employed may vary widely depending upon the amount of metal and/or metal ions desired in the final composition and on the conditions under which crystallization is effected. An amount of metal compound introduced into the zeolite forming mixture, however, is generally such that the ultimate crystalline zeolite contain therein an amount of metal and/or metal ions, expressed in terms of metal, from about 0.001 percent to about 5 percent by weight, and more usually between about 0.001 percent and about 0.5 percent by weight.

After the contact period, the resulting crystalline zeolite containing metal and/or metal ions therein is removed from the forming solution and washed with water. The resulting material is then dried, generally in air, to remove substantially all of the water therefrom.

Synthetic faujasite-like compositions may be prepared in accordance with the method described herein. Thus, a zeolite-forming mixture resulting in a faujasite-like composition is employed with an anionic metal complex whereby the metal content so introduced will enter into and become a part of the crystal lattice, and hence will remain "fixed" or "bound" within the zeolite so that it will resist removal, e.g., by washing or base exchange.

In accordance with the invention as generally contemplated, a solution of a water-soluble metal compound wherein the metal is an anionic form, the metal thereof being capable of forming a Werner complex, is introduced into the zeolite forming mixture prior to crystallization of the zeolite. The resulting wet crystalline zeolite containing metal and/or metal ions is thereafter dried and, if desired, may be subjected to a thermal treatment. The finished catalyst is dry and contains in the zeolitic structure a minor amount of metal content, as metal and/or metal ions.

As previously noted, the alkali metal or alkaline earth metal ions present in the zeolite may be replaced partially or completely by other cations utilizing ion exchange techniques. Thus rare earth ions may be so introduced. For example, a cracking catalyst having markedly improved regenerability characteristics can be formed by introducing a water-soluble iron or chromium compound into a synthetic faujasite-forming mixture prior to crystallization, effecting crystallization, and then exchanging with a solution containing rare earth ions to introduce rare earth ions into the zeolite. Thereafter the zeolite is dried and subjected to thermal treatment as heretofore described. Of course, rather than utilizing ion exchange techniques, the zeolite may be impregnated with other cations such as rare earth ions and the like.

The following examples will further illustrate this invention.

Examples 1-19 hereinafter illustrate the preparation of faujasite-types of zeolitic compositions made up of pores approximately 13 angstroms in diameter. Each such zeolite contained metals or metal ions introduced in the anionic portion of a reagent utilized to prepare such zeolite.

EXAMPLE 1

In a porcelain evaporating dish was placed 0.7 gram sodium hydroxide pellets and 0.6 gram manganese dioxide. These materials were carefully fused and after cooling, the solid product was extracted with 10 ml. "deionized" distilled water.[1] This completed the preparation of sodium manganate solution.

A solution prepared by dissolving 18.5 grams sodium aluminate (75% assay) in 150 ml. deionized distilled water was filtered through a fluted filter paper into a polypropylene beaker. A similar solution was prepared by dissolving 84 grams of sodium metasilicate nonahydrate in 250 ml. deionized distilled water and filtering.

The aluminate and silicate solutions were poured rapidly together into a polypropylene beaker containing the manganate solution. The mixture was stirred for two minutes to insure complete mixture, and then was allowed to stand at 100° C. for 8 hours. During this time crystallisation took place as indicated by a gradual settling of the solids in the beaker. The solids were removed from the crystallization media by filtration through a No. 42 Wratten paper on a propylene Büchner funnel. The filter cake was washed with 1000 ml. deionized distilled water and the washed solids were placed in a muffle furnace for 20 hours at 350° C. The product was a gray powder with a yield of 21.93 grams. The product analyzed as follows:

Water sorption, wt. percent=33.4
Cyclohexane sorption, wt. percent=18.5
Manganese, wt. percent=0.49 (as Mn metal)*
Sodium, wt. percent=13.1 (as Na metal)*
Alumina, wt. percent=35.8 (as $AlO_2$)*
Silica, wt. percent=49.5 (as $SiO_2$)*
Crystallinity (X-ray)=90% (based on Linde 13×)

*In this and all subsequent examples, the alumina and silica are reported as $AlO_2$ and $SiO_2$, respectively; the remainder are reported as metal.

A portion of this material was tested in a microcatalytic reactor using a "pulse" technique. At 900° F. catalyst temperature, 12.3% $CO_2$ was formed from a 10% CO in air mixture. A pulse of 1% n-butane in air under similar conditions gave 2.4% $CO_2$. This compared with 1.6% $CO_2$ from CO and 1.5% from n-butane for a similar sample which served as a "control," and which was prepared without added metal.

EXAMPLE 2

This example was similar to Example 1, however a different solution was used to incorporate the manganese. Thus, a permanganate solution containing 1.2 grams potassium parmanganate in 15 ml. deionized distilled water was used instead of the sodium manganate solution of Example 1.

---

[1] Deionized distilled water was prepared by passing distilled water through an ion exchange column (28 inches long x 2.5 inches diameter, filled with mixed ion exchange resin bed) at a moderate rate. As an index of purity, this water contained less than 1 p.p.m. iron.

Analysis of the product gave the following results:

Water sorption, wt. percent=33.1
Cyclohexane sorption, wt. percent=18.3
Manganese, p.p.m.=130

EXAMPLE 3

This example was similar to Example 1 with the exception that the solution containing the manganate consisted of: 0.1 gram manganese dioxide; 0.2 gram sodium hydroxide pellets; dissolved in 10 ml. deionized distilled water.

The product recovered (23.6 grams), after drying to 350° C. analyzed as follows:

Water sorption, wt. percent=30.5
Cyclohexane sorption, wt. percent=17.7
Manganese, wt. percent=0.29
Sodium, wt. percent=14.6
Alumina, wt. percent=35.8
Silica, wt. percent=49.6
Crystallinity (X-ray)=105% (based on Linde 13X)

Oxidation of CO with air over the aluminosilicate prepared in this example gave 12.3%, compared to 1.6% $CO_2$ for the control material. In a similar experiment (as described in Example 1, using the pulse technique) n-butane oxidation gave 3.3% $CO_2$, compared to 1.5 for the control.

EXAMPLE 4

This example was similar to Example 2, except that sodium permanganate (trihydrate) was used in place of potassium permanganate.

The crystalline aluminosilicate analyzed as follows:

Water sorption, wt. percent=32.0
Cyclohexane sorption, wt. percent=17.9
Manganese, p.p.m.=260
Sodium, wt. percent=13.5
Alumina, wt. percent=36.3
Silica, wt. percent=49.6
Crystallinity (X-ray)=115% (based on Linde 13X)

EXAMPLE 5

A solution of sodium ferrate was prepared by reacting 20.0 grams sodium hydroxide and 1.4 grams ferric chloride in 40 ml. deionized distilled water, permitting the whole to cool to room temperature, and then passing a slow stream of chlorine gas therethrough for 10 minutes. Gradually the solids were brought into a purple solution.

A solution containing 18.5 grams of sodium aluminate (75% assay) in 150 ml. deionized distilled water was filtered through a fluted filter paper into a polypropylene beaker. A similar solution was prepared by dissolving 84.0 grams sodium metasilicate (nonahydrate) in 250 ml. deionized distilled water. The aluminate and silicate solutions were poured together rapidly into a polypropylene beaker containing the ferrate solution. After mixing to assure complete reaction of components, the mixture was allowed to stand for 9½ hours at 100° C. After cooling, the solids were removed by filtration through a sintered glass funnel, and washed with 1000 ml. deionized distilled water. The resulting tan solids were heated in a muffle furnace for 19 hours at 350° C. The solids (23.02 grams) and analyzed as follows:

Water sorption, wt. percent=26.2
Cyclohexane sorption, wt. percent=13.7
Iron, wt. percent=1.20
Sodium, wt. percent=14.1
Alumina, wt. percent=38.3
Silica, wt. percent=46.4
Crystallinity=70% (based on Linde 13X)

A sample of the material prepared in this example was tested for oxidation activity as described in Example 1. The formation of 13.3% $CO_2$ from CO (compared to 1.6 for the control) and 10.1% $CO_2$ from n-butane (compared to 1.5% for the control) was noted.

A second sample of the material prepared in this example is treated with a stream of dry hydrogen at a temperature of 220° C. and a pressure of 100 p.s.i.g. for four hours, resulting in the formation of iron hydride. The flow of hydrogen is stopped, and the product is then treated with a stream of dry, oxygen-free synthesis gas consisting of three parts by volume of hydrogen and one part by volume of nitrogen at a temperature of 220° C. and a pressure of 200 p.s.i.g. The resulting synthesized ammonia gas is continuously removed and recovered by scrubbing with water.

EXAMPLE 6

The same method was used as described in Example 5, except that the ferrate solution was prepared in the following proportions:

5.0 grams sodium hydroxide pellets
0.4 gram ferric chloride
10 ml. deionized distilled water The finished product analyzed as follows:

Water sorption, wt. percent=30.2
Cyclohexane sorption, wt. percent=17.7
Iron, wt. percent=0.29
Sodium, wt. percent=14.1
Alumina, wt. percent=37.5
Silica, wt. percent=49.6
Crystallinity (X-ray)=100% (based on Linde 13X)

Oxidation carried out via the previously described pulse technique (Example 1) with the catalyst prepared in this example gave 12.5% $CO_2$ from CO and 6.0% $CO_2$ from n-butane. This compared to 1.6% and 1.5%, respectively, for the control.

EXAMPLE 7

This example was similar to Example 5, however the crystallization was carried out in a nitrogen atmosphere in order to exclude air.

The dried product analyzed as follows:

Water sorption, wt. percent=24.2
Cyclohexane sorption, wt. percent=11.5
Iron, wt. percent=1.17
Sodium, wt. percent=14.2
Alumina, wt. percent=37.2
Silica, wt. percent=47.5
Crystallinity (X-ray)=45% (based on Linde 13X)

EXAMPLE 8

This example was similar in method to Example 2, except that a vanadate reagent was employed rather than a manganate. The vanadate reagent was prepared as follows: 2.9 grams sodium orthovanadate (hexadecahydrate) were dissolved in 10 ml. deionized distilled water.

After the usual washing and drying to 350° C. the product analyzed as follows:

Water sorption, wt. percent=31.4
Cyclohexane sorption, wt. percent=18.0
Vanadium, p.p.m.=16
Sodium, wt. percent=14.7
Alumina, wt. percent=35.5
Silica, wt. percent=48.4
Crystallinity (X-ray)=105% (based on Linde 13X)

EXAMPLE 9

This example was almost identical to Example 8, however the reaction mixture was stirred during crystallization.

The product analyzed as follows:

Water sorption, wt. percent=26.7
Cyclohexane sorption, wt. percent=15.8
Vanadium, p.p.m.=101
Sodium, wt. percent=13.2
Alumina, wt. percent=35.5
Silica, wt. percent=49.5
Crystallinity (X-ray)=85% (based on Linde 13X)

EXAMPLE 10

The method used in this example was similar to Example 8, however, the sodium orthovanadate was replaced with 1.0 gram sodium metavanadate. After drying at 350° C., the product analyzed as follows:

Water sorption, wt. percent=31.3
Cyclohexane sorption, wt. percent=16.9
Vanadium, p.p.m.=26
Sodium, wt. percent=13.6
Alumina, wt. percent=34.9
Silica, wt. percent=49.3
Crystallinity (X-ray)=100% (based on Linde 13X)

EXAMPLE 11

This example was similar to Example 8, however a vanadite solution was utilized rather than sodium metavanadate. The vanadite solution was prepared as follows: 3.46 grams sodium orthovanadate (hexahydrate) in 25 ml. deionized distilled water were treated with a stream of sulfur dioxide gas for 10 minutes at room temperature. The solution turned a deep blue color.

The dried product analyzed as follows:

Water sorption, wt. percent=29.9
Cyclohexane sorption, wt. percent=17.6
Vanadium, p.p.m.=1036
Sodium, wt. percent=12.9
Alumina, wt. percent=35.8
Silica, wt. percent=50.4
Crystallinity (X-ray)=100% (based on Linde 13X)

A one gram sample of this material was placed in the reactor of a small scale glass unit and heated to 1000° F. while a stream of helium was passed over it after first having been passed through an adsorber containing n-hexane at room temperature. The chromatographic analysis of the products indicated the following:

| Component: | Wt. percent |
|---|---|
| Methane | 3.3 |
| Ethane+ethylene | 6.8 |
| Propane | 4.6 |
| Propylene | 8.6 |
| n-Butane | 0.4 |
| Butane-1 | 1.9 |
| t-Butene-2 | 2.1 |
| o-Butene-2 | 1.7 |
| $C_5$–$C_6$ sum | 1.5 |
| n-hexane | 69.0 |
| | 100.0 | n-Hexane conversion=31.0%, compare to a conversion of 10.3% for the control material (without added vanadium).

EXAMPLE 12

This example was similar to Example 8, except that a chromate solution was employed rather than a vanadate solution. The chromate solution was prepared by dissolving 1.1 grams potassium dichromate in 10 ml. deionized distilled water.

Analysis of the dried product indicated the following:

Water sorption, wt. percent=33.5
Cyclohexane sorption, wt. percent=18.3
Chromium, p.p.m.=40

EXAMPLES 13

This example was similar to Example 12, except that a sodium chromate solution was employed rather than a potassium dichromate solution. 1.6 grams of sodium chromate (tetrahydrate) was added to the aluminate solution before filtration.

The product analyzed as follows:

Water sorption, wt. percent=32.2
Cyclohexane sorption, wt. percent=18.2
Chromium, p.p.m.=20

EXAMPLE 14

This example was similar to Example 12, with the exception that a chromite reagent was employed rather than a potassium dichromate solution. The chromite solution was prepared as follows: sodium hydroxide (0.48 gram) and the chromium oxide (0.61 gram) were carefully fused in an evaporating dish. The resulting solids were slurried into 20 ml. deionized distilled water and placed in the reaction vessel prior to addition of the aluminate and silicate solutions.

After about 35 hours (allowed for crystallization) the product was collected by filtration, washed, and dried at 350° C. overnight. The yield was 22.0 grams. The product, when microscopically examined, appeared to have clumps of a yellow color on or in a white solid. This material analyzed as follows:

Water sorption, wt. percent=30.2
Cyclohexane sorption, wt. percent=17.1
Chromium, wt. percent=0.72

This example was similar to Example 12 except that rather than using potassium dichromate, 1.6 grams sodium chromate (tetrahydrate) in 10 ml. deionized distilled water were employed.

The resulting product analyzed as follows:

Water sorption, wt. percent=28.6
Cyclohexane sorption, wt. percent=14.0
Chromium, p.p.m.=190

EXAMPLE 16

This example was similar to Example 15 except that 4.0 grams of sodium chromate (tetrahydrate) in 20 ml. deionized distilled water were used for chromate introduction into the reaction beaker.

Analysis of the dried product resulting from this preparation gave the following results:

Water sorption, wt. percent=31.6
Cyclohexane sorption, wt. percent=18.7
Chromium, p.p.m.=less than 50.

EXAMPLE 17

This example was similar to Example 16 with the exception that the reagent solution present in the reaction beaker before aluminate and silicate solution addition was composed of: 1.8 grams sodium molybdate (dihydrate) in 15 ml. deionized distilled water.

The product analyzed as follows:

Water sorption, wt. percent=30.5
Cyclohexane sorption, wt. percent=18.8
Molybdenium, p.p.m.=40

EXAMPLE 18

Aluminate and silicate solutions were prepared as described in Example 1. A reagent containing titanite was prepared by careful fusion of 0.48 gram sodium hydroxide pellets and 0.64 gram titanium dioxide. After the fusion mass had cooled, 20 ml. of deionized distilled water was added and the resulting slurry was added to the reaction beaker.

The crystalline aluminosilicate formed analyzed as follows:

Cyclohexane sorption, wt. percent=18.4
Titanium, wt. percent=0.92
Sodium, wt. percent=13.4
Alumina, wt. percent=31.2
Silica, wt. percent=49.6
Crystallinity (X-ray)=100% (based on Linde 13×)

EXAMPLE 19

This example was nearly identical to Example 18, except that the solids of the fusion were extracted with water and only the resulting aqueous solution was used.

Analysis of the material formed gave the following results:

Water sorption, wt. percent=31.8
Cyclohexane sorption, wt. percent=18.2
Titanium, p.p.m.=600
Sodium, wt. percent=13.6
Alumina, wt. percent=35.4
Silica, wt. percent=49.6
Crystallinity (X-ray)=90% (based on Linde 13×)

The following example illustrates the shape selective aspects of the compositions of this invention:

EXAMPLE 20

A catalyst similar to that of Example 5 is produced by mixing the indicated quantities of aluminate and silicate solutions together rapidly in a polypropylene beaker containing the ferrate solution prepared as described in Example 5. After crystallization, the mixture is filtered and the solids are then contacted with several changes of sufficient excess of one normal calcium acetate solution to insure that the major portion of the sodium cations are replaced by an equivalent amount of calcium cations. The ferrate-containing 10× zeolite which results is filtered, rinsed, and dried in a muffle furnace for 19 hours at 350° C.

Over a portion of this catalyst contained in a reactor is passed a mixture of isomeric triethylbenzenes which contains 50 wt. percent of 1,3,5-triethylbenzene and hydrogen at 400° C. Analysis of the recovered liquids, after distillation, shows that the recovered triethylbenzene contains 75% of the 1,3,5-isomer, which is not able to enter the pores of the crystalline aluminosilicate; the other isomers, entering the pores are converted to benzene and ethane which are subsequently removed by distillation.

As previously noted, the catalysts of the present invention have use for many different applications, e.g., in catalyzing oxidation, hydrogenation, cracking, hydrocracking, isomerization, and the like. Where the metal contained within the crystalline aluminosilicate zeolite is iron or manganese, the resulting product is particularly suitable for use in effecting certain hydrogenation or dehydrogenation reactions. Thus, in contrast to prior art catalysts employed for such reactions, wherein it has generally been necessary to deposit therein a suitable hydrogenation component, the foregoing metal-containing catalysts of the present invention do not require subsequent impregnation with a hydrogenation component.

Where the metal component introduced into the crystalline aluminosilicate zeolite is one which promotes catalytic oxidation, a particularly suitable application for the resulting metal-containing crystalline aluminosilicate zeolite is for use in effecting oxidation of unburned combustibles present in exhaust gases of internal combustion engines. A highly suitable apparatus and method for effecting catalytic oxidation of combustible components contained in exhaust gases of an internal combustion engine are illustrated in U.S. Pat. 3,067,002 to Reid. It will be apparent that metal-containing catalysts of the present invention, wherein the metal is one suitable for promoting catalytic oxidation, are eminently suitable for use in effecting combustion of combustible components in exhaust gases, e.g., as by utilizing such catalysts in the method described in the foregoing Reid patent.

Variations can, of course, be made without departing from the spirit of our invention.

Having thus described our invention, what we desire to secure and claim by Letters Patent is:

1. In a method for preparing a synthetic alumino-silicate zeolite characterized by rigid three-dimentional networks and having uniform pores from in excess of 6 angstroms to about 15 angstroms wherein an aluminum compound and a silicon compound are reacted to form an amorphous precipitate and crystallization of said precipitate is induced by subjecting the same to thermal treatment, followed by dehydration of the crystalline product; the improvement which comprises introducing a minor amount of a water-soluble metal compound into the reaction mixture prior to said crystallization, the metal of said metal compound being one which is capable of forming a Werner complex wherein the metal is present in the anionic portion thereof, said Werner complex being defined by the formula

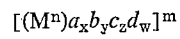

$$[(M^n)a_x b_y c_z d_w]^m$$

wherein
M is the metal,
n is the valence state of the metal and is an integer from +1 to +6,
a, b, c, and d are coordinated groups,
x, y, z, and w are integers from zero to 8, the sum of x, y, z, and w being not in excess of 8, and m is the electrostatic charge of the complex, whereby the growth of crystals of said zeolite takes place in the presence of said introduced metal compound to afford a resulting product in which there is contained throughout the resulting dehydrated structure a material selected from the group consisting of said metal, ions of said metal, and mixtures thereof.

2. The method of claim 1 wherein said metal is selected from the class consisting of Groups IV-B, V-B, VI-B, VII-B, and VIII of the Periodic Table.

3. The method of claim 2 wherein the amount of said water-soluble metal compound is such that the content of said metal in the resulting crystalline zeolite, expressed in terms of metal, is from about 0.001 to 5 percent by weight.

4. The method of claim 2 wherein said metal is selected from the group consisting of platinum, manganese, iron, vanadium, chromium, molybdenum, titanium, cobalt, and palladium.

5. The method of claim 1 wherein said zeolite is a faujasite and said metal compound is a ferrate.

6. The method of claim 1 wherein said zeolite is a faujasite and said metal compound is a chromate.

7. The method of claim 1 wherein said zeolite is a faujasite and said metal compound is a vanadate.

8. The method of claim 1 wherein said zeolite is a faujasite and said metal compound is a manganate.

9. The method of claim 1 wherein said zeolite is a faujasite and said metal compound is a permanganate.

10. The method of claim 1 wherein said zeolite is a faujasite and said said metal compound is a vanadite.

11. The method of claim 1 wherein said zeolite is a faujasite and said metal compound is a chromite.

12. The method of claim 1 wherein said zeolite is a faujasite and said metal compound is a molybdate.

13. The method of claim 1 wherein said zeolite is a faujasite and said metal compound is a titanite.

14. A catalytic composition consisting essentially of a crystalline aluminosilicate zeolite characterized by rigid three-dimensional networks and uniform pores of from in excess of 6 angstroms to about 15 angstroms in diameter, said zeolite containing therein a material selected from the group consisting of a metal and ions of said metal, said metal being selected from Groups IV-B, V-B, VI-B, VII-B, and VIII of the Periodic Table, said zeolite resulting from the growth of crystals of said zeolite from an aqueous medium containing a water-soluble compound of said metal, said metal being present during said growth in the anionic portion of a Werner complex.

15. The composition of claim 14 wherein said crystalline aluminosilicate zeolite contains from about 0.001 to 5 percent by weight of said metal, expressed in terms of metal.

16. The catalytic composition of claim 14 wherein said metal is selected from the group consisting of platinum, manganese, iron, vanadium, chromium, molybdenum, titanuim, cobalt, and palladium.

17. The catalytic composition of claim 14 wherein said zeolite is a faujasite and said metal is vanadium.

18. The catalytic composition of claim 14 wherein said zeolite is a faujasite and said metal is titanium.

19. The catalytic composition of claim 14 wherein said zeolite is a faujasite and said metal is chromium.

20. The catalytic composition of claim 14 wherein said zeolite is a faujasite and said metal is iron.

21. The catalytic composition of claim 14 wherein said zeolite is a faujasite and said metal is molybdenum.

22. The catalytic composition of claim 14 wherein said zeolite is a faujasite and said metal is manganese.

23. In a method for preparing a synthetic aluminosilicate zeolite characterized by rigid three-dimensional networks and having uniform pores from in excess of 6 angstroms to about 15 angstroms wherein an aluminum compound and a silicon compound are reacted to form an amorphous precipitate and crystallization of said precipitate is induced by subjecting the same to thermal treatment, followed by dehydration of the crystalline product; the improvement which comprises introducing a minor amount of a water-soluble metal compound into the reaction mixture prior to said crystallization, the metal of said metal compound being one which is capable of forming a Werner complex wherein the metal is present in the anionic portion thereof, said Werner complex being defined by the formula $$[(M^n)a_x b_y c_z d_w]^m$$

wherein
M is the metal,
$n$ is the valance state of the metal and is an integer from +1 to +6.
$a$, $b$, $c$, and $d$ are coordinated groups,
$x$, $y$, $z$, and $w$ are integers from zero to 8, the sum of $x$, $y$, $z$, and $w$ being not in excess of 8, and $m$ is the electrostatic charge of the complex, whereby the growth of crystals of said zeolite takes place in the presence of said introduced metal compound to afford a resulting product in which there is contained throughout the resulting dehydrated structure a material selected from the group consisting of said metal, ions of said metal, and mixtures thereof, and subjecting the resultant crystalline aluminosilicate zeolite to sulfiding, carbiding, nitriding, oxiding, seleniding, telluriding, hydriding or haliding to thereby afford a resulting product in which there is contained throughout the resulting dehydrated structure a compound of said metal, said compound being the corresponding metal sulfide, carbide, nitride, oxide, selenide, telluride, hydride or halide, or a mixture of said compound with a material selected from the group consisting of said metal and ions of said metal.

24. A catalytic composition consisting essentially of a crystalline aluminosilicate zeolite characterized by rigid three-dimensional networks and uniform pores of from in excess of 6 angstroms to about 15 angstroms in diameter, said zeolite containing therein a material selected from the group consisting of a metal, ions of said metal, a compound of said metal, and mixtures thereof, said metal being selected from Groups IV–B, V–B, VI–B, VII–B, and VIII of the Periodic Table, said zeolite resulting from the growth of crystals of said zeolite from an aqueous medium containing a water-soluble compound of said metal, said metal being present during said growth in the anionic portion of a Werner complex, said zeolite having been produced by the process of claim 13, and said compound of said metal being selected from the group consisting of the sulfides, carbides, nitrides, oxides, selenides, tellurides, hydrides and halides of said metal.

References Cited
UNITED STATES PATENTS 3,322,690   5/1967   Bilisoly _____ 252—455

CARL F. DEES, Primary Examiner